United States Patent Office 3,508,788
Patented Apr. 28, 1970

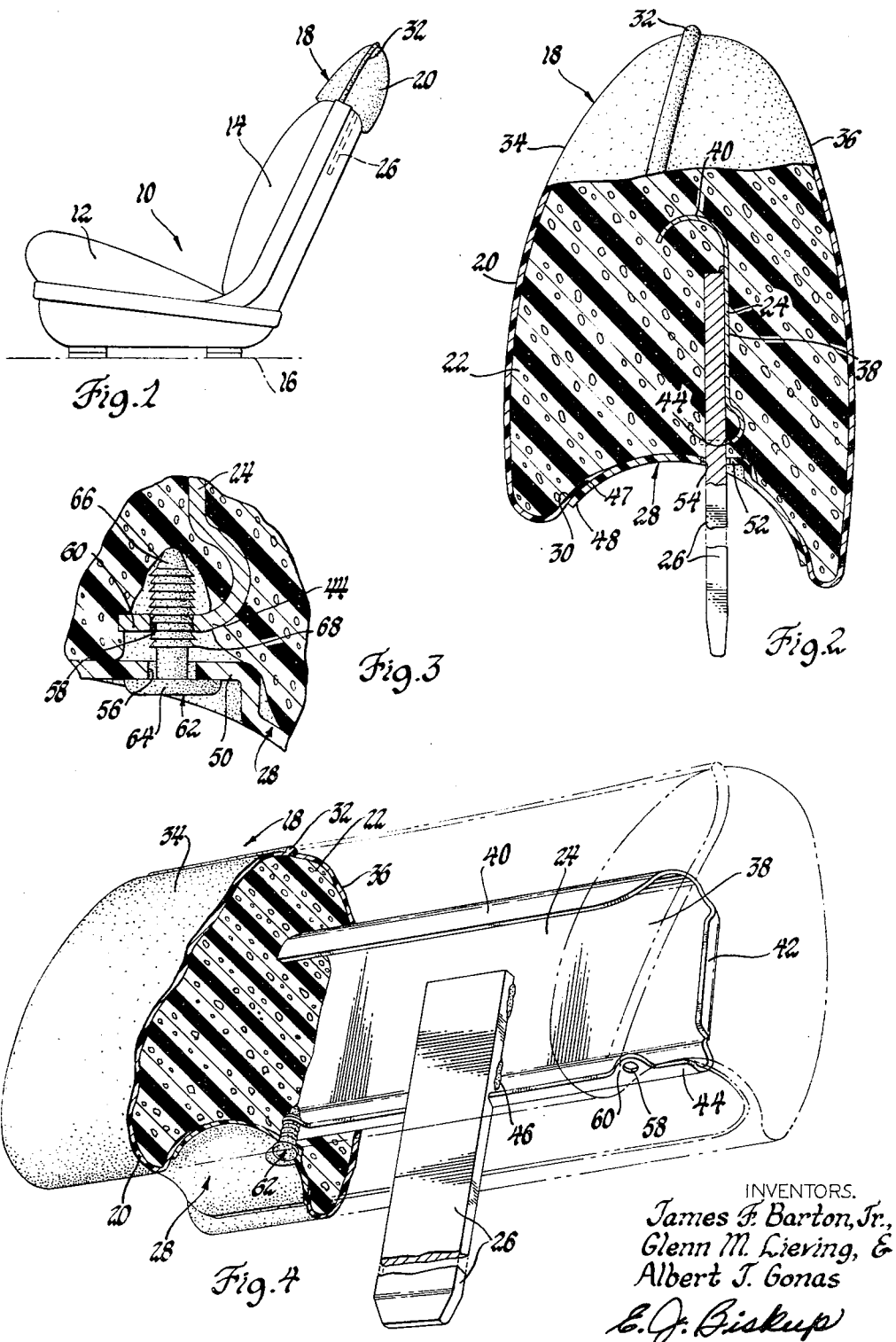

3,508,788
VEHICLE HEADREST
James F. Barton, Jr., Livonia, Glenn M. Lieving, Warren, and Albert J. Gonas, Grosse Pointe, Mich., assignors to General Motors Corporation, Detroit, Mich., a corporation of Delaware
Filed Aug. 6, 1968, Ser. No. 750,513
Int. Cl. A47c 7/38
U.S. Cl. 297—391         3 Claims

ABSTRACT OF THE DISCLOSURE

A headrest for a motor vehicle seating unit that includes a flexible shell having a downwardly opening cavity and a metallic reinforcing member located therewithin. A foam padding fills the cavity and is adhesively bonded to the interior surface of the shell and the reinforcing member to form an integral headrest construction. A support bar is attached at an upper end to the reinforcing member and has a lower end that is adapted to be adjustably connected to a vehicle seatback. A plastic cover plate is inserted over the support member and is secured against the shell by plastic fastening devices which have ribbed shank portions that locally deform within holes formed in the reinforcing member.

---

The headrest constructions currently in use in motor vehicles are usually provided with three basic components. A resilient internal padding is used to give the desired resilient head supporting characteristics. Support means that are adapted to be attached to the vehicle seatback are used to give proper vertical support in positioning the padding material. A flexible skin is used to decoratively cover the padding and portions of the support means. Where a preformed fitted skin is used to cover the padding, it is necessary to provide some means such as drawstrings, zippers, buttons or clasps for closing the exposed seams. If properly sized, the skin will tightly conform to the padding and, in addition to concealing the internal structure, will provide a wrinkle-free exterior appearance for the headrest. However, normal manufacturing variations make it virtually impossible to achieve uniform and accurate sizing of the skin with respect to the internal headrest structure. In these instances, the resulting wrinkles and sags detract from the outward appearance of the headrest.

In order to overcome the drawbacks of a fitted exterior skin, it has been proposed to use a cast external shell and, by a second molding operation, integrally bond a resilient foam padding to the interior surface of the shell and to an internally located reinforcing member. While this construction eliminates the problems of forming the external covering to snugly fit the foam padding, it also provides a cavity opening in the shell which must be decoratively covered to give a satisfactory outward appearance for the headrest. Previously, the cavity openings have been covered by a relatively thin vacuum-formed plastic patch. The patch was inserted over the support member and glued or otherwise adhesively attached at the rim of the cavity opening. However, inasmuch as this skin is relatively flexible, an excessive amount of time was required to accurately fit the patch to the shell so as to avoid wrinkling and sagging. Additionally, the adhesive applied between the rim and the patch tended to extrude between the patch and the shell onto the exterior surface of the skin. Chemical solvents were required to remove the adhesives and, in many instances, it was found that solvents caused a discoloration and deterioration of the skin and the patch thereby preventing a serious quality control problem.

The present invention contemplates overcoming the aforementioned problems by providing a relatively rigid cover plate which is used to decoratively cover the cavity opening of the shell and is secured thereto by means of simple mechanical fasteners. To this end, a cover plate conforming in shape to a continuation of the under surface of the above described integral headrest construction is formed from a relatively rigid plastic material and has an outer peripheral surface that overlaps and engages the rim of the cavity. The headrest reinforcing member and cover plate are provided with pairs of spacially opposed laterally spaced apertures. A pair of plastic fasteners are inserted through the apertures in the cover plate and have deformable shank portions which are pressed into the apertures of the reinforcing member. The shank portions locally deform within these apertures to thereby fixedly secure the cover plate against the shell and to the reinforcing member. In addition to eliminating the need for adhesively joining the cover plate to the external surface, it will be appreciated that the use of a rigid cover plate will affirmatively eliminate the problem of wrinkling and sagging. Also, the rigid cover plate is more easily located in assembly by the installer and the use of the simple mechanical fasteners greatly reduces the time and effort required for assembling the plate to the headrest.

Accordingly, it is an object of the present invention to provide a headrest construction of the type having an integral shell and internal padding structure wherein a relatively rigid cover plate is used to cover an opening in the shell and is secured thereto by means of simple mechanical fastening devices.

Another object of the present invention is to cover the under surface of a headrest of a type having an external flexible shell and an internal foam filled cavity wherein a plastic cover plate overlaps the rim of the cavity and is held thereagainst by means of plastic fasteners.

Yet another object of the present invention is to provide a wrinkle-free, non-sagging cover plate for decoratively covering the non-covered surface in a headrest construction using a foam padding to integrally bond an external flexible shell to a support member. Plastic fasteners are received through holes formed in the cover plate and include ribbed shank portions which locally deform within apertures formed in the reinforcing member to secure the cover plate against the shell.

These and other objects will be apparent to one skilled in the art upon reading the following detailed description, reference being made to the accompanying drawings in which:

FIGURE 1 is a side elevational view of a motor vehicle seating unit incorporating a headrest made in accordance with the present invention;

FIGURE 2 is an enlarged fragmentary cross-sectional view of the headrest shown in FIGURE 1;

FIGURE 3 is an enlarged cross-sectional view showing the connection between the cover plate and the reinforcing member; and FIGURE 4 is a partially sectioned perspective view of the headrest shown in FIGURES 1 through 3.

Referring to FIGURE 1, there is shown a motor vehicle seating unit 10 including a seating cushion 12 and a rearwardly located upwardly projecting seatback 14. The seating cushion 12 is suitably attached to a support surface such as a vehicle floor panel 16. A headrest 18, made in accordance with the present invention, is mounted at the top of the seat back 14 in a head supporting relationship thereto.

Referring to FIGURE 2, the headrest 18 generally comprises a flexible outer shell 20, a core section including a foam padding 22 and a reinforcing member 24, a support bar 26 and a cover plate 28.

The shell 20 is formed from a flexible plastic material such as vinyl and may be made by any suitable process such as rotational casting. The shell 20 has a relatively thin cross section in the order of .020 to .030 inch and the inner surface thereof defines a cavity opening downwardly at an inwardly turned peripheral rim 30. A raised bead portion 32 is formed integrally with the shell 20 and laterally divides the shell into a head supporting front surface 34 and a rear surface 36. The mold cavity used for casting the shell may be suitably formed to provide a grained exterior appearance for the surfaces 34 and 36.

The reinforcing member 24 may be formed from sheet metal and generally includes a laterally extending rectangular base 38, a forwardly turned upper end 40, inwardly turned sides 42 and an inwardly turned forwardly projecting lower flange 44. In assembly, the ends 40 and 42 and the flange 44 provide structural rigidity for the foam padding 22 and the shell 20 as well as preventing a shifting of the padding material.

The headrest support bar 26 has a generally rectangular cross section and is centrally connected at its upper end to the base 38 by welds 46. While a single support is shown in the illustrative embodiment, it will be appreciated that many shapes and numbers of support means could be equally incorporated into the present invention. As is conventional, the lower end of the support bar 26 is adapted to cooperate with a suitable adjusting mechanism located within the seat back 14 to permit the headrest 18 to be located in a plurality of vertical positions.

The foam padding 22 is bonded to the interior surface of the shell 20 and to the reinforcing member 24 in a second molding operation. The molded shell 20 is received within a retaining mold and the reinforcing member 24 is centrally disposed within the shell cavity. A foaming resin such as polyurethane foam is then poured into the shell cavity. The resin subsequently expands within the shell cavity to form the foam padding 22 which has an integral bond with the interior surface and the reinforcing member 24. After the resin has cured, the integral subassembly thus formed has an exposed cavity opening 47 which is decoratively covered in a manner to be described below.

The cover plate 28 is formed of a relatively rigid material such as polypropylene and has a lateral and longitudinal contour conformed to a continuation of the under surface of the shell 20. The cover plate 28 has an outer peripheral surface 48 that overlaps and engages rim 30 of the cavity opening 47. As shown in FIGURES 2 and 3, the cover plate 28 is provided with a pair of laterally spaced bosses 50 and a centrally disposed ledge 52. The ledge 52 has a rectangular slot 54 formed therein for receiving the support bar 26. As shown in FIGURE 3, a hole 56 is formed in each of the bosses 50. When the cover plate 28 is inserted over the support bar 26, the holes 56 are spacially aligned with a pair of laterally spaced apertures 58 formed in tabs 60 projecting forwardly from the front edge of the flange 44.

Referring to FIGURE 3, the cover plate 28 is secured against the shell 20 and to the reinforcing member 24 by means of plastic fasteners 62. The plastic fasteners 62 include an enlarged head 64 and an upwardly projecting shank portion including a rounded tip 66 and a plurality of axially aligned conical rib surfaces 68.

To assemble the cover plate 28 to the headrest 18, the former is inserted over the support member 26 through the slot 54 to a position where the peripheral surface 48 engages the rim 30. The shank portion of the fastener 62 is inserted through the hole 56 and the tip 66 is received within the aperture 58 to preliminarily align the fastener 62 and the cover plate 28 with respect to the under surface of the shell 20. The rib surfaces 62 have a slightly larger diameter than the apertures 58 and, upon axial insertion therewithin, the rib surfaces 68 locally deform to securely lock the cover plate 28 against the rim 30 between the head 64 and the flange 44.

With particular regard to the fasteners 62, it will be appreciated that the axial insertion of the ribs 68 can be controlled to accommodate normal manufacturing variances while, at the same time, providing the desired compressive engagement between the surface 48 and the rim 30. Moreover, due to the plastic material used in the fasteners 62 and the relative sizing of the holes 56 and the slot 54, the cover plate 28 is substantially self-aligning in assembly and, accordingly, the time required to align and securely fasten the cover plate 28 to the headrest 18 is substantially reduced.

Although only one form of this invention has been shown and described, other forms will be readily apparent to those skilled in the art. Therefore, it is not intended to limit the scope of the invention by the embodiment selected for the purpose of this disclosure but only by the claims which follow.

What is claimed is:

1. In a motor vehicle headrest having a flexible covering defining a cavity having an opening in a lower surface thereof, a core section received within said cavity and including a reinforcing member and a foam padding adhesively bonded to the reinforcing member, and support means connected to said reinforcing member and extending outwardly of the covering, the improvement comprising: means for covering said cavity opening including, a relatively rigid cover plate including an opening for receiving said support means, said cover plate inserted over said support means and having a portion thereof overlapping said cavity opening and engaging said covering; apertures formed in said cover plate; apertures formed in said reinforcing member in spaced relationship to said first mentioned apertures; fasteners received within said first mentioned apertures having head portions overlapping said first mentioned apertures and engaging a surface of the cover plate and shank portions inserted and locally deformed within said second mentioned apertures whereby said cover plate is fixedly connected between said head portions and said reinforcing member to secure said cover plate against said covering.

2. A headrest assembly for use with a motor vehicle seating unit, comprising: a shell formed of a flexible material, said shell having a head-supporting exterior surface and an interior surface defining a cavity opening downwardly at a peripheral rim; a reinforcing member received within the cavity; a support member connected at one end to the reinforcing member, said support member extending outwardly of the cavity and having the other end thereof adapted for mounting on the seating unit; a foam material filling said cavity and bonded to said reinforcing member and said interior surface of said shell; a cover plate formed of a relatively rigid plastic material received over said support member and having a peripheral surface engaging said rim; and a fastening device connecting said cover plate to said reinforcing member.

3. A head rest construction comprising: a shell formed of a flexible material having a head-supporting exterior surface terminating with an inwardly turned peripheral rim, the interior surface of said shell defining a cavity opening downwardly at said rim; a reinforcing member received within the cavity and extending substantially vertically and transversely therewithin, said reforcing member having laterally spaced apertures formed in a portion thereof; a support member having one end connected to the reinforcing member and the other end extending outwardly of the shell; a resilient foam padding filling said cavity, said padding being adhesively bonded to said reinforcing member and said interior surface of said shell to form an integral subassembly; a plastic cover plate conforming to a continuation of the under surface of said shell; an opening formed in said cover plate for receiving said support member, said cover plate being inserted over said support member through said opening to a position wherein a peripheral surface thereof engages said rim; laterally spaced holes formed in said cover plate and registering with said apertures; and plastic fastening devices having enlarged head portions and axially extending shank portions including deformable axially spaced surfaces, said head portions overlying said holes and engaging a surface of said cover plate, said shank portions being inserted through said holes and said axially spaced surfaces locally deforming within said apertures whereby said cover plate is secured against said rim between said head portions and said reinforcing member.

References Cited

UNITED STATES PATENTS

| | | |
|---|---|---|
| 3,245,719 | 4/1966 | Davidson _____ 297—397 |
| 3,387,881 | 6/1968 | Stepanek et al. ___ 248—118 XR |
| 3,403,938 | 10/1968 | Cramer et al. _____ 297—391 |
| 3,429,615 | 2/1969 | Belk. |

KENNETH DOWNEY, Primary Examiner

U.S. Cl. X.R.

297—397, 410